United States Patent [19]

Sawa et al.

[11] 3,923,866
[45] Dec. 2, 1975

[54] PROCESS FOR PRODUCING INDAN DERIVATIVES

[75] Inventors: Yoichi Sawa, Osaka; Toshinori Hattori, Suita; Susumu Katsube; Akitoshio Goto, both of Osaka, all of Japan

[73] Assignee: Takeda Chemical Industries, Japan

[22] Filed: June 19, 1973

[21] Appl. No.: 371,525

[30] Foreign Application Priority Data
June 19, 1972 Japan.............................. 47-61140
Nov. 21, 1972 Japan............................. 47-117021

[52] U.S. Cl.......... 260/469; 260/456 P; 260/465 R; 260/465 G; 260/515 A; 260/558 A; 260/590; 260/618 F; 260/650 R
[51] Int. Cl.$^2$....................................... C07C 63/595
[58] Field of Search............. 260/469, 515 A, 558 A

[56] References Cited
UNITED STATES PATENTS
3,324,174  6/1967  Braun et al. ..................... 260/515 A
3,435,075  3/1969  Glamkowski et al. .............. 260/469

OTHER PUBLICATIONS
Chiavarelli, Gazz. Chim. Ital. Vol. 85 Fasc XI, pp. 1405–1410 (1955).

Protiva et al., Chem. Abst., 47:8057a (1953).

Smith et al., Chem. Abst. 33:2112$^5$, (1939).

*Primary Examiner*—Anton H. Sutton
*Assistant Examiner*—Michael Shippen
*Attorney, Agent, or Firm*—Wenderoth, Lind & Ponack

[57] ABSTRACT

5-Cyclohexylindan-1-carboxylic acid or esters thereof or amide thereof can be prepared starting from 5-cyclohexylindan-1-ol through replacing hydroxyl group at 1-position with halogen or organic sulfonyl group followed by replacing the halogen or organic sulfonyl group with nitril group, then hydrolysis or alcoholysis. The 5-cyclohexylindan-1-carboxylic acid or esters thereof or amide thereof can be obtained in its 6-halogenated derivative by the substitution of halogenation step at optional intermediate steps.

The thus obtained compound is useful as anti-inflammatory agent, analgesics, antipyretics, antirheumatics and so on for either human and veterinary use.

4 Claims, No Drawings

PROCESS FOR PRODUCING INDAN DERIVATIVES

This invention relates to a novel process for producing indan derivatives of general formula:

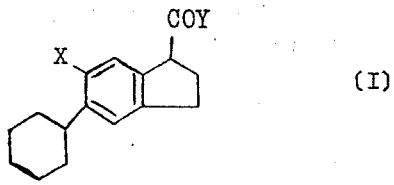

(I)

wherein X stands for a hydrogen atom or a halogen atom and Y stands for a hydroxyl group, an amino group or an alkoxy group having 1 to 6 carbon atoms, which are useful as anti-inflammatory agent, analgesics, antipyretics, antirheumatics and other medicines.

Heretofore, there have been known a few processes for producing indan derivatives of general formula (I) starting from cyclohexyl benzene through several steps (U.S. Pat. No. 3,565,943, Japanese Pat. application No. 70287/1971 (laid open to public inspection on May 11, 1972) and German Pat. application No. P 20 23 000.6 (laid open to public inspection on Aug. 5, 1971)). However, in the process of Japanese Pat. application No. 70287/1971, use of an expensive compound such as 1,3-dithian is required and absolutely anhydrous conditions are required for the reaction using 1,3-dithian and further by-production of such a poisonous gas as mercaptan is unavoidable in the reaction step for preparation of 5-cyclohexylindan-1-carboxylic acid from 5-cyclohexyl-1-[2-(1,3l-dithianilidene)] indan. Thus, this process is far from being industrially advantageous.

On the other hand, in the processes of U.S. Pat. No. 3,565,943 and German Pat. application No. P 20 23 800.6, the over-all yield of the desired product from cyclohexylbenzene is very low, i.e. about 9 %, and therefore, they are also disadvantageous from an industrial and practical point of view.

Taking the circumstances mentioned above into consideration, the present inventors conducted, extensive studies and finally accomplished the present invention.

Thus, the principal and essential object of the present invention is to provide a novel method for producing the indan derivatives of the general formula (I), which is not accompanied with the disadvantages mentioned above.

According to the method of the present invention, the desired compound can be obtained at a rather high yield i.e. about 40 % starting from cyclohexyl-benzene, without using any expensive compound or reagent and without evolution of any poisonous gas, under normal and mild reaction conditions.

The process of the present invention is shown by the following equations.

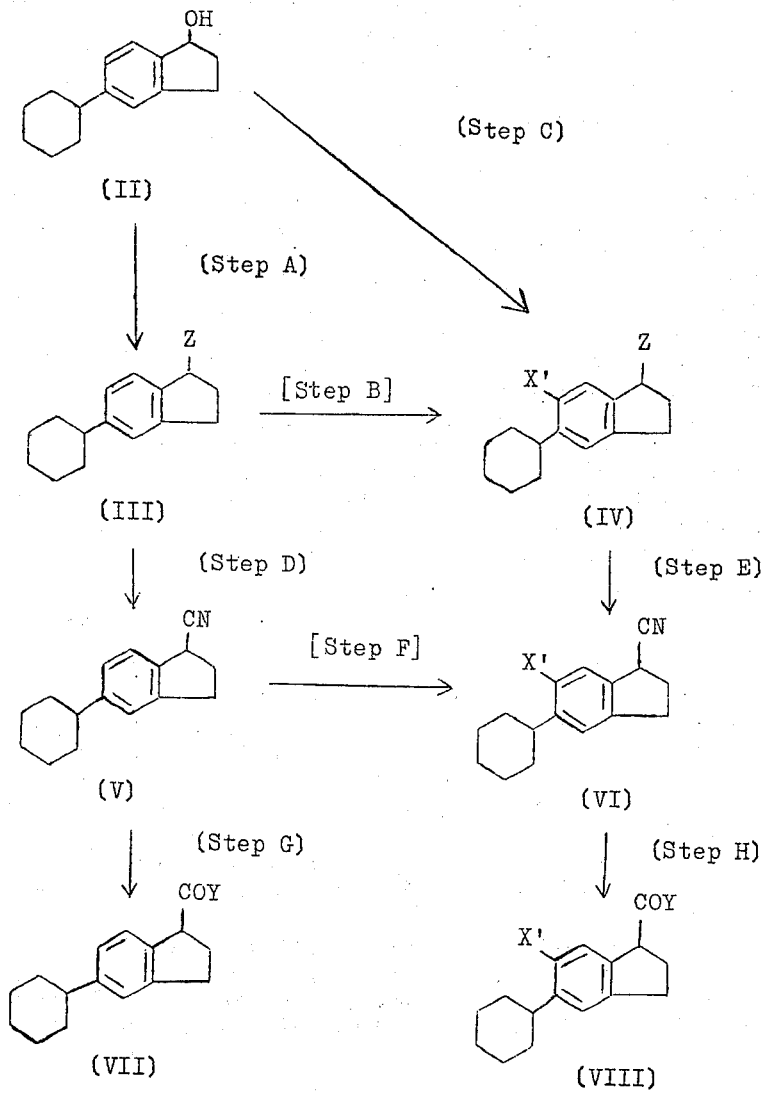

(wherein X' stands for a halogen atom; Z stands for a halogen atom or an aryl sulfonyloxy group; and Y stands for a hydroxyl group, an amino group or a lower alkoxy group having 1 to 6 carbon atoms).

The halogen represented by X, X' and Z is exemplified by bromine, chlorine, iodine and fluorine. The aryl group of aryl sulfonyloxy group represented by Z is exemplified by phenyl, tolyl and so on. The lower alkoxy group represented by Y may be either saturated or unsaturated and may be a straight-chain, branched or cyclic group. The lower alkoxy group is exemplified by methoxy, ethoxy, n-propoxy, i-propoxy, allyloxy, 1-propenyloxy, n-butoxy, i-butoxy, sec-butoxy, tert-butoxy, n-pentyloxy, n-hexyloxy, cyclopropyloxy, cyclobutyloxy, cyclopentyloxy, cyclohexyloxy and so on. Among them, a lower alkoxy group having 1 to 4 carbon atoms is preferable.

The reaction of Step A is carried out by subjecting the compound (II) to halogenation reaction or sulfonylation reaction.

The halogenation reaction which replaces the hydroxyl group in 1-position of compound (II) with a halogen atom can be performed with advantage by using a suitable halogenating agent which can replace a hydroxyl group with halogen, usually in the presence of a solvent. The halogenating agent is exemplified by hydrogen halide (e.g. hydrogen chloride, hydrogen bromide, hydrochloric acid, hydrobromic acid, etc.), thionyl halide (e.g. thionyl chloride), halogenated phosphorous compounds (e.g. phosphorus oxychloride, phosphorus trichloride, phosphorus pentachloride, phosphorus tribromide, etc.) and so on. The amount of said halogenating agent to be used is usually in the range of about 1 to 5 moles, preferably about 1 to 2 moles, per mole of compound (II). The solvent employable in this reaction may be any organic solvent of the type which is routinely employed in ordinary halogenation reactions, thus being exemplified by halogenated hydrocarbons (e.g. carbon tetrachloride, chloroform, ethylene dichloride, methylene chloride, etc.), nitrobenzene, carbon disulfide, hydrocarbons (e.g. benzene, toluene, etc.), alkyl cyanide (e.g. acetonitrile etc.) and so on. It is at times possible to employ an excess of the halogenating agent so that it will function as a solvent as well. This halogenation reaction will at times proceed more advantageously if it is conducted in the presence of an acid acceptor, examples of which are tertiary amines (e.g. pyridine, dimethylaniline, triethylamine, etc.).

The sulfonylation reaction can be generally performed with advantage by reacting the compound (II) with an aromatic-sulfonylating agent in a suitable solvent. The aromatic-sulfonylating agent is exemplified by benzene-sulfonyl chloride, p-toluenesulfonyl chloride, benzene-sulfonyl bromide, p-toluenesulfonyl bromide, etc. The amount of such an aromatic-sulfonylating agent to be used is generally in the range of about 1 to 2 moles, preferably about 1 to 1.2 moles per mole of compound (II). The solvent used in this reaction may for example be pyridine or picoline. This reaction at times proceeds advantageously in the presence of an acid acceptor. The acid acceptor is exemplified by tertiary amines (e.g. pyridine, dimethylaniline, triethylamine, etc.), alkali metal carbonates (e.g. sodium carbonate, potassium carbonate, etc.), alkali metal bicarbonates (e.g. sodium bicarbonate, potassium bicarbonate, etc.), alkali metal hydroxides (e.g. sodium hydroxide, potassium hydroxide, etc.), alkali metals (e.g. metallic sodium), alkali metal alcoholates (e.g. sodium methylate, sodium ethylate, etc.) and so on. Among these acid acceptors, tertiary amines are capable of functioning as a solvent as well.

The reaction of Step B is carried out by subjecting the compound (III) to halogenation reaction. The halogenation reaction can be advantageously conducted by reacting a compound (III) with a halogenating agent in the presence of a catalyst. The halogenating agent is exemplified by free halogen (e.g. chlorine, bromine, iodine, etc.), sulfuryl halide (e.g. sulfuryl chloride), N-bromosuccinimide, N-chlorosuccinimide and so forth. The proportion of the halogenating agent is usually in the range of about 1 to 2 moles, preferably about 1 to 1.2 moles, per mole of the compound (III), although the halogenating agent may be used in excess so that it will function both as a reagent and as a reaction solvent. As regards the catalyst to be employed in this reaction, all halogen compounds of metals or non-metals which are able to promote ionic reactions of halogens can be employed. Thus, such metal halides as aluminum chloride, ferric chloride, antimony trichloride, antimony pentachloride, stannic chloride, etc. and such non-metal halides as boron trifluoride may be mentioned by way of example. While the proportion of the catalyst is largely optional, it is particularly desirable to use about 0.5 molecular equivalent or more and, particularly, about 1 molecular equivalent to a slight excess of the catalyst relative to the compound (III). Though this reaction can be successfully carried out in the absence of a solvent, this reaction is usually carried out in the presence of a solvent. The solvent may be of the type which is employed in the halogenation reaction of Step A. To avoid occurrence of a side reaction, the reaction temperature is generally preferably kept not to exceed about 100°C. It is also possible to conduct the reaction under cooling with ice.

The reaction of Step C is carried out by subjecting the compound (II) to halogenation reaction. This halogenation reaction is conducted by substantially the same manner with the halogenation reaction of Step B.

The reaction of Step D is carried out by substituting the substituent at the 1-position of compound (III) with nitrile group (this reaction is referred to as "nitrilization reaction" hereinafter). The nitrilization reaction can be advantageously performed by reacting the compound (III) with an agent capable of substituting the substituent at the 1-position of compound (III) with nitrile group (such an agent is referred to as nitrilizing agent hereinafter) generally in a solvent. As the nitrilizing agent, any one may be used so long as it can replace the halogen atom or aryl sulfonyloxy group represented by Z at 1-position of compound (III) with a cyano group, thus being exemplified by alkali metal cyanide (e.g. sodium cyanide, potassium cyanide, etc.). The proportion of the nitrilizing agent is not critical, only if it is not less than equimolar with respect to compound (III). For practical purposes, however, it is generally desirable to use the nitrilizing agent in amounts from about 1 to about 5 moles per mole of compound (III). As the solvent, any one may be employed so long as it is inert to the reaction, which is exemplified by hydrocarbons (e.g. benzene, xylene, toluene, etc.), dialkylformamide (e.g. dimethylformamide, diethylformamide, etc.), dialkylsulfoxide (e.g. dimethylsulfoxide, etc.), alkyl cyanide (e.g. acetonitrile, phenylacetonitrile, etc.), alcohols (e.g. t-butanol, ethanol, etc.), ketones (acetone, etc.), cyclic amines (e.g. N-methylpyrrolidone, etc.), water and suitable mixtures of such solvents. While the reaction proceeds at room temperature, it may be accelerated by heating the reaction system to a temperature ranging from about 30°C to a temperature near the boiling point of the solvent employed. The nitrilization reaction of this step sometimes proceeds more advantageously in the presence of a catalytic amount of alkali metal halide such as potassium iodide and sodium iodide.

The reaction of Step E is carried out by subjecting a compound (IV) to nitrilization reaction. The nitrilization reaction can be conducted by almost the same manner with the nitrilization reaction of Step D.

The reaction of Step F is carried out by subjecting a compound (V) to halogenation reaction. The halogenation reaction can be conducted by almost the same manner with the halogenation reaction of Step B.

The reaction of Step G is carried out by subjecting the compound (V) to hydrolysis or a serial process of alcohol addition and hydrolysis. The hydrolysis and alcohol addition reactions of this step are carried out after the manner of conventional hydrolysis and alcohol addition reactions, i.e. in the presence of a catalyst and a solvent which are routinely used for hydrolysis and alcohol addition reactions. Thus, the catalyst is exemplified by Lewis acids (e.g. sulfuric acid, hydrochloric acid, hydrobromic acid, boron trifluoride, polyphosphoric acid, etc.), organic acids (e.g. toluenesulfonic acid, benzenesulfonic acid, strongly acid ion exchange resin (e.g. Amberlite IR-120, etc.)), alkali hydroxide (e.g. sodium hydroxide, potassium hydroxide, barium hydroxide, etc.) and so on. The proportion of the catalyst is usually in the range of 1 mole to large excess, preferably about 2 to 20 moles per mole of compound (V). The solvent may be any one that will not adversely affect the reaction of this step, thus being exemplified by water, alcohols (e.g. methanol, ethanol, propanol, isopropanol, butanol, isobutanol, sec-butanol, ethylene glycol, etc.), ketones (e.g. acetone, methyl ethyl ketone, etc.), organic carboxylic acid (e.g. acetic acid, etc.) and mixtures of the above species. In this step, generally hydrolysis is carried out. While the temperature of this hydrolysis reaction is virtually optional, the reaction can be advantageously conducted at room temperature or under heating or cooling; in the latter cases, the temperature may be selected from the range of 0° to 200°C and, preferably, 50° to 150°C. When an alcohol or a solvent mixture including an alcohol (excepting mixtures with water) is used as the reaction solvent, an alcohol addition reaction takes place, giving rise to the imidoether which, upon hydrolysis, yields the compound in which Y is an alkoxy group. To conduct the alcohol addition reaction, the alcohol is employed in excess, preferably 5 to 20 moles, to each mole of compound (V). While this alcohol addition reaction may be conducted at virtually any temperature, it can be advantageously carried out generally at room temperature or under heating or cooling. In the latter instances the temperature is selected from the range of 0° to 200°C and, preferably, 50° to 150°C. The alcohol addition and hydrolysis reactions may be carried out independently or in a single step. When the reaction is conducted under relatively mild conditions i.e. in the use of an organic acid or alkali hydroxide as a catalyst and at a relatively low temperature such as about 40° to about 80°C, the compound (VII) wherein Y is an amino group is obtained. On the other hand, when the reaction is conducted under strict conditions i.e. in the use of an inorganic acid as the catalyst and at a high temperature such as about 80° to 150°C, the compound (VII) wherein Y is an hydroxyl group is obtained.

The reaction of Step H is carried out by subjecting the compound (VI) to hydrolysis or a serial process of alcohol addition and hydrolysis. The reaction of this step is conducted by almost the same manner with Step H.

The end product compound (I) thus obtained can be isolated and purified from the reaction mixture by procedures which are conventional per se (e.g. extraction, distillation, recrystallization, chromatography, etc.).

The following is a partial listing of the compounds (I) which can be typically produced by the method of this invention.

5-Cyclohexyl-6-bromoindan-1-carboxylic acid
5-Cyclohexyl-6-chloroindan-1-carboxylic acid ethyl ester
5-Cyclohexyl-6-chloroindan-1-carboxylic acid propyl ester
5-Cyclohexyl-6-chloroindan-1-carboxylic acid butyl ester
5-Cyclohexyl-6-bromoindan-1-carboxylic acid methyl ester
5-Cyclohexyl-6-bromoindan-1-carboxylic acid ethyl ester
5-Cyclohexyl-6-bromoindan-1-carboxylic acid propyl ester
5-Cyclohexyl-6-bromoindan-1-carboxylic acid butyl ester
5-Cyclohexyl-6-bromoindan-1-carboxyamide
5-Cyclohexylindan-1-carboxylic acid methyl ester
5-Cyclohexylindan-1-carboxylic acid ethyl ester
5-Cyclohexylindan-1-carboxylic acid propyl ester
5-Cyclohexylindan-1-carboxylic acid butyl ester The end product compounds (I) which can thus be produced have potent antiphlogistic, analgetic and antipyretic activities and low toxicity. Therefore, these compounds are of use as antiphlogistics, analgesics, antipyretics, antirheumatics and other medicines.

The starting compound (II) to be employed in the present invention is a novel compound and it can be prepared by, for example, the following procedure.

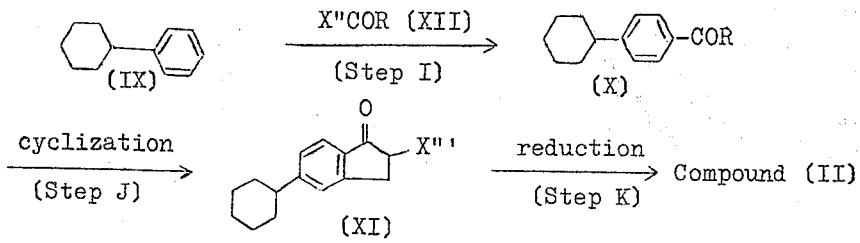

(wherein R designates an alkyl group or a group represented by

(wherein A designates a halogen atom, a hydroxyl group, an alkoxy group or an aryl sulfonyloxy groups and B designates a hydrogen atom or a halogen atom), X" designates a halogen atom, a hydroxyl group or a group R'—CO—O— in which R' is alkyl, aryl, aralkyl or alkoxy, and X''' designates a halogen atom.

In the above formulas, the halogen atoms designated by A, B, X" and X''' are exemplified by chlorine, bromine, iodine and fluorine. The alkoxy group represented by A may be a lower alkoxy group having 1 to 3 carbon atoms such as methoxy, ethoxy, n-propoxy and isopropoxy. For the group R', the alkyl is one having 1 to 4 carbon atoms (e.g. methyl, ethyl, n-propyl, isopropyl, n-butyl or isobutyl), the aryl is such as phenyl and naphtyl, the aralkyl is such as benzyl and phenetyl, and the alkoxy is one having 1 to 4 carbon atoms (e.g. methoxy, ethoxy, propoxy, butoxy). The aryl sulfonyloxy group represented by A is exemplified by phenylsulfonyloxy group or p-tosyloxy group.

Referring further to the preparation of starting compound of general formula (II), the reaction of step I can be conducted with advantage by reacting cyclohexylbenzene with a compound of general formula (XII) usually in the presence of a catalyst. The reaction solvent for use in this step may be a solvent of the type suited to the halogenation reaction of Step B. As regards the catalyst, compounds which are generally known as Lewis acids, particularly metal halides such as aluminum chloride, aluminum bromide, tin chloride, iron chloride, zinc chloride, arsenic trifluoride, boron trifluoride, titanium chloride, etc. may be mentioned by way of example. For practical purposes, the preferred amount of the catalyst is generally about 1 to 2 moles per mole of compound (XII).

The reaction of step J is generally carried out by subjecting the compound (X) obtained by step I to an intramolecular cyclization reaction in the presence of a catalyst and either in the presence of a solvent or in the absence of a solvent. When the reaction is conducted in a solvent, use may be made of, for example, any of the solvents useful for the reaction of step I and organic solvents (e.g. formic acid, acetic acid, etc.). The catalyst may be any of the metal halides useful for step I, inorganic acids (e.g. sulfuric acid, hydrogen chloride, hydrogen fluoride, hydrogen bromide, hydrogen iodide, phosphoric acid, polyphosphoric acid, polyphosphoric acid esters, etc.), phosphorus halide (e.g. phosphorus pentafluoride) and mixtures of these catalysts. While the cyclization reaction generally proceeds at a temperature between room temperature to the boiling point of a solvent used or at temperatures in the neighborhood of 100°C, it may at times be conducted at higher or lower temperatures. The cyclization reaction of step J may be carried out immediately following the reaction of step I without isolating the intermediate product, i.e. the compound of general formula (X), The reaction of step K is carried out by reducing the carbonyl group of the compound of general formula (XI) which has been obtained by the reaction of step J. This reduction may be performed by any means that will convert the carbonyl group to a hydroxyl group and that will not hydrogenate the benzene nucleus. As such reduction, there may, for example, be catalytic reduction in the presence of a conventional catalyst such as nickel, palladium, copper, chromium or the like; reduction by means of the so-called nascent hydrogen which can be evolved by using a metal such as sodium amalgam, aluminum amalgam, zinc, iron or tin in combination with an acid (e.g. hydrochloric acid), water, alcohol (e.g. ethanol), alkali (e.g. sodium) or other; reduction by means of a hydrogenated metal compound such as lithium aluminum hydride, diethyl aluminum hydride or sodium borohydride; or electrolytic reduction. In this connection, when a compound of general formula (XI) in which X''' designates a halogen atom is reduced by using a suitable combination of said hydrogenated metal compound with Raney nickel, the halogen atom X''' in 2-position is reductively cleaved off simultaneously with the reduction of the carbonyl group in the 1-position, thereby giving rise to a compound of general formula (II). If, depending on the type of reducing agent employed, the reduction of a compound (XI) in which X''' designates a halogen atom is limited to the reduction of the carbonyl group in 1-position, it is further necessary to reductively remove the halogen atom in 2-position by employing said combination of metal hydride compound and Raney nickel. The amount of the catalyst, the type of solvent, pressure, reaction temperature and other conditions depend on the type of starting material.

The following examples and reference examples are given to further illustrate the present invention.

In the following examples and reference examples, the relation between "part(s) by weight" and "part(s) by volume" corresponds to that between gram and milliliter.

(Step A)

EXAMPLE 1

In 1.5 parts by weight of pyridine is dissolved 1 part by weight of 5-cyclohexyl-1-indanol and the solution is cooled well. Then, 0.9 part by weight of tosyl chloride is added and the mixture is allowed to stand at room temperature for 1 to 12 hours. Thereafter, it is poured into ice-water, followed by standing for a little while, whereupon colorless needles separate. The needles are recovered by filtration, washed with 1 N hydrochloric acid a few times and, then, with cold water and ether in that order. The procedure gives 1.7 parts by weight of colorless needles of 5-cyclohexyl-1-indanol tosylate.

Yield: 100%

Elementary analysis: Calculated for $C_{22}H_{26}O_3S$: C, 71.32; H, 7.07. Found: C, 71.48; H, 6.98.

EXAMPLE 2

In 10 parts by volume of dichloromethane is dissolved 2.2 parts by weight of 5-cyclohexyl-1-indanol and the solution is cooled with ice. Then, a solution of 1.3 parts by weight of thionyl chloride in dichloromethane is added at low temperature and, the mixture is allowed to react at room temperature for 1 hour. Finally the solvent is distilled off. The procedure gives an oil of 1-chloro-5-cyclohexylindan in almost quantitative yield. NMR (CDCl$_3$) δ : 7.00–7.40 (aromatic protons), 5.37 (1-methyl protons), 2.30–3.35 (methylene protons), 1.00–2.30 (cyclohexyl protons).
(Step B)

EXAMPLE 3

In 40 parts by volume of acetonitrile is dissolved 4.4 parts by weight of 1-chloro-5-cyclohexylindan. The solution is cooled to 5°C and under stirring, chlorine gas is bubbled through the solution. After the reaction has been completed, the solvent is distilled off and the crystalline residue is recrystallized from acetonitrile. The procedure gives 4.5 parts by weight of colorless prisms of 1,6-dichloro-5-cyclohexylindan. Melting point: 65°–66°C.
Yield: 90%
Elementary analysis: Calculated for $C_{15}H_{18}Cl_2$: C, 66.92; H, 6.74. Found: C, 66.84; H, 6.88.
(Step C)

EXAMPLE 4

In 40 parts by volume of acetonitrile is dissolved 4 parts by weight of 5-cyclohexyl-1-indanol and, then, chlorine gas is bubbled through the solution. After the reaction has been completed, the acetonitrile is distilled off and the crystalline residue is recrystallized from acetonitrile. The procedure gives 4 parts by weight of 5-cyclohexyl-1,6-dichloroindan as colorless crystals melting at 65°–66°C. Yield: 60%
(Step D)

EXAMPLE 5

In 8 parts by volume of water is dissolved 2.4 parts by weight of sodium cyanide and a solution of 2.3 parts by weight of 1-chloro-5-cyclohexylindan in 20 parts by volume of dimethylformamide is added dropwise. After the dropwise addition has been completed, the reaction is allowed to proceed to 60°C for 30 minutes, at the end of which time the reaction mixture is poured in water and extracted with benzene. The extract is washed with water, dehydrated and distilled to remove the solvent, whereupon a yellowish brown oil is obtained. The oil is chromatographed on a column of silica gel and eluted with benzene. The procedure gives 1.35 parts by weight of 5-cyclohexylindan-1-carbonitrile as a colorless oil boiling at 160°–165°C/1 mmHg. The oil is ready to crystallize; melting point 61°C.
Yield: 60%
Elementary analysis: Calculated for $C_{16}H_{19}N$: C, 85.28; H, 8.50; N, 6.22. Found: C, 85.36; H, 8.62; N, 5.90.

EXAMPLE 6

In a mixture of 40 parts by volume of N-methylpyrrolidone and 2 parts by volume of t-butanol, there is suspended 0.7 part by weight of sodium cyanide. Then, 1 part by weight of 5-cyclohexyl-1-indanol tosylate is added to the suspension. The mixture is heated at 80°C for 7 hours, with stirring. After cooling, the reaction mixture is poured in ice-water and extracted with benzene. The extract is washed with water, dehydrated and distilled to remove the solvent. Finally, the residue is chromatographed on a column of silica gel and eluted with benzene, whereupon 0.35 part by weight of 5-cyclohexylindan-1-carbonitrile is obtained as a colorless oil. The IR and NMR spectra of this product are in agreement with the corresponding spectra of the product according to Example 5.
Yield: 56%
(Step E)

EXAMPLE 7

In 50 parts by volume of dimethylformamide is dissolved 4 parts by weight of sodium cyanide and under stirring, a solution of 5.4 parts by weight of 1,6-dichloro-5-cyclohexylindan in dimethylformamide is added dropwise. After the dropwise addition has been completed, the mixture is allowed to react at 60°–70°C for 3 hours. Then, the solvent is distilled off and the residue is diluted with water and extracted with benzene. The extract is washed with water, dehydrated and distilled to remove the solvent. The residue is finally passed through a chromatographic column of silica gel using n-hexanebenzene (10:1), whereupon 4 parts by weight of 6-chloro-5-cyclohexyl-1-indancarbonitrile is obtained.
Melting point: 96°–98°C.
Yield: 77%
Elementary analysis Calculated for $C_{16}H_{18}ClN$: C, 73.98; H, 6.98; N, 5.39. Found: C, 73.76; H, 6.84; N, 5.22.
(Step F)

EXAMPLE 8

In 50 parts by volume of acetonitrile is dissolved 4.5 parts by weight of 5-cyclohexylindan-1-carbonitrile and chlorine gas is bubbled into the solution under cooling with ice and vigorous stirring. A gas chromatographic monitoring shows that the 6-position is chlorinated in about 5 minutes. At the end of this 5 minutes, the reaction mixture is concentrated to dryness to recover 5 parts by weight of yellowish brown crystals. Recrystalization from ethyl ether-n-hexane yields 4.5 parts by weight of 5-cyclohexyl-6-chlorindan-1-carbonitrile as colorless prisms melting at 96°–98°C.
Yield: 86.4%
Elementary analysis: Calculated for $C_{16}H_{18}ClN$: C, 73.98; H, 6.98; N, 5.39. Found: C, 73.88; H, 7.04; N, 5.46.
(Step G)

EXAMPLE 9

In dilute sulfuric acid is suspended 9 parts by weight of 5-cyclohexylindan-1-carbonitrile and, under vigorous stirring, the suspension is heated at a temperature of about 120°C for about 5 hours. After cooling, the reaction mixture is poured into ice-water and extracted with ethyl ether. The extract is dried and distilled to remove the solvent, whereupon 9.5 parts by weight of crude crystals are obtained. Recrystallization from ligroine gives 7.9 parts by weight of 5-cyclohexylindan-1-carboxylic acid as colorless needles.
Melting point: 142°–143°C.
Yield: 81.0%

Elementary analysis:
Calculated for $C_{16}H_{20}O_2$: C, 78.65; H, 8.25. Found: C, 78.36; H, 8.14.

EXAMPLE 10

In 35 parts by volume of hydrochloric acid is suspended 9 parts by weight of 5-cyclohexylindan-1-carbonitrile and the suspension is allowed to react at 80°–100°C under vigorous stirring for about 10 hours. Then, the reaction mixture is poured into ice-water, and extracted with ether. The extract is washed well with a 10% aqueous solution of sodium carbonate and, then, washed with water. After drying, the ether is distilled off. The residual starting material is separated by column chromatography on silica gel and the desired compound is recrystallized from ethanol-ether. The procedure yields 7.5 parts by weight of 5-cyclohexylindan-1-carboxyamide as colorless needles melting at 165°–166°C.

Yield: 77.%

Elementary analysis: Calculated for $C_{16}H_{21}NO$: C, 78.97; H, 8.70; N, 5.76. Found: C, 78.68; H, 8.78; N, 5.59.

EXAMPLE 11

2.0 Parts by weight of 5-cyclohexylindan-1-carbonitrile is dissolved in 100 parts by volume of methanol and, to the above solution are added 10 parts by volume of 5% aqueous solution of sodium hydroxide and 3 parts by volume of 30% aqueous solution of hydrogen peroxide. Then the mixture is heated at 60°C under mild stirring for 2 hours. The reaction mixture is acidified with dilute hydrochloric acid and, to the mixture is added 1,500 parts by volume of water. After the mixture is left standing overnight, the resulting precipitates are collected by filtration, washed with water, dehydrated and recrystallized from methanol. The procedure gives 1.8 parts by weight of 5-cyclohexylindan-1-carboxyamide.

Melting point: 166°–168°C.
Yield: 83.5%
Elementary analysis:
Calculated for $C_{16}H_{21}NO$: C, 78.97; H, 8.70; N, 5.76. Found: C, 78.73; H, 8.67; N, 5.50.

EXAMPLE 12

To 2.0 parts by weight of 5-cyclohexylindan-1-carbonitrile are added 50 parts by volume of 38% acetic acid solution of boron trifluoride and 5 parts by volume of water, and the mixture is heated at 60°C. After left standing overnight at room temperature, the mixture is poured into 1,000 parts by volume of water. The precipitates are collected by filtration, washed with water and dehydrated. The precipitates are recrystallized from methanol, whereupon 1.9 parts by weight of 5-cyclohexylindan-1-carboxyamide is obtained.

Melting point: 165°–168°C.
Yield: 88%
Elementary analysis: Calculated for $C_{16}H_{21}NO$: C, 78.97; H, 8.70; N, 5.76. Found: C, 78.79; H, 8.63; N, 5.71.

EXAMPLE 13

To 2.0 parts by weight of 5-cyclohexylindan-1-carbonitrile is added 100 parts by weight of polyphosphoric acid, and the mixture is heated at 60°C with stirring. After left standing overnight at room temperature, the mixture is poured into 1,000 parts by volume of water. The resulting precipitates are collected by filtration, washed with water and dehydrated. The precipitates are recrystallized from methanol to give 1.8 part by weight of 5-cyclohexylindan-1-carboxyamide.

Melting point: 166°–168°C.
Yield: 83.3%
Elementary analysis: Calculated for $C_{16}H_{21}NO$: C, 78.97; H, 8.70; N, 5.76. Found: C, 78.74; H, 8.68; N, 5.66.

(Step H)

EXAMPLE 14

In dilute sulfuric acid is suspended 1 part by weight of 5-cyclohexyl-6-chloroindan-1-carbonitrile and, under vigorous stirring, the suspension is heated on an oil bath at about 120°C for about 5 hours. After cooling, the reaction mixture is poured into ice-water and extracted with ether. The extract is washed well with water, dehydrated and then distilled to remove the solvent, whereupon 1 part by weight of yellowish brown crystals are obtained. Recrystallization from ether-hexane gives 0.9 part by weight of 5-cyclohexyl-6-chloroindan-1-carboxylic acid as colorless crystals melting at 150°–152°C.

Yield: 83.9%

Elementary analysis: Calculated for $C_{16}H_{19}ClO_2$: C, 68.94; H, 6.87; Cl, 12.72. Found: C, 68.88; H, 6.74; Cl, 12.62.

EXAMPLE 15

To 5 parts by volume of 30% aqueous solution of potassium hydroxide is added 1 part by weight of 5-cyclohexyl-6-chloroindan-1-carbonitrile and, under vigorous stirring, the mixture is refluxed on an oil bath overnight. After cooling, the reaction mixture is poured into ice-water and washed with ether. Under cooling, the water layer is made acidic with respect to hydrochloric acid and extracted with benzene. After washing with water, the organic layer is dehydrated and distilled to remove the solvent. The crystalline residue is then recrystallized from ether-n-hexane to obtain 0.9 part by weight of colorless crystals of 5-cyclohexyl-6-chloroindan-1-carboxylic acid.

Yield: 83.7%

The melting point, infrared absorption and other properties of this product are in complete agreement with the corresponding properties of the compound according to Example 14.

EXAMPLE 16

To a solution of 1 part by weight of potassium hydroxide in ethylene glycol is added 1 part by weight of 5-cyclohexyl-6-chloroindan-1-carbonitrile and the mixture is heated at 180°C under stirring. After cooling, the reaction mixture is poured into ice-water and extracted with ether. The water layer is acidified with hydrochloric acid, extracted with ether and washed well with water. After drying, the solvent is distilled off and the resulting crystals are recrystallized from n-hexane, whereupon 0.8 part by weight of 5-cyclohexyl-6-chloroindan-1-carboxylic acid is obtained as colorless crystals.

Yield: 74.4%

The melting point, infrared absorption and other properties of this product are in complete agreement with the corresponding properties of the product according to Example 9.

EXAMPLE 17

In hydrochloric acid is suspended 2.6 parts by weight of 5-cyclohexyl-6-chloroindan-1-carbonitrile and the suspension is treated in the same manner as Example 10. The procedure yeilds 2.1 parts by weight of 5-cyclohexyl-6-chloroindan-1-carboxyamide which melts at 184°–185°C.

Yield: 73%

Elementary analysis: Calculated for $C_{16}H_{20}ClNO$: C, 69.18; H, 7.26; N, 5.04. Found: C, 69.02; H, 7.34; N, 5.12.

EXAMPLE 18

Under stirring, 2.6 parts by weight of 5-cyclohexyl-6-chloroindan-1-carbonitrile is heated in a mixture of 20 parts by volume of methanol and 2 parts by weight of concentrated sulfuric acid for 2 hours. After cooling, the reaction mixture is poured into ice-water, and extracted with ether. The extract is then washed well with water, a 5 % aqueous solution of sodium bicarbonate and water in the order mentioned. After drying, the solvent is distilled off and the residue is distilled under reduced pressure. The procedure yields 2.4 parts by weight of 5-cyclohexyl-6-chloroindan-1-carboxylic acid methyl ester as an oily product boiling at 170°–171°C/1 mmHg.

Yield: 82%

Elementary analysis: Calculated for $C_{17}H_{21}ClO_2$: C, 69.73; H, 7.23. Found: C, 69.52; H, 7.01.

EXAMPLE 19

After the similar manner to Example 18, 2.5 parts by weight of 5-cyclohexylindan-1-carboxylic acid ethyl ester is produced from 2.6 parts by weight of 5-cyclohexylindan-1-carbonitrile by using ethanol as a solvent.

This product boils at 165°–175°C/1 mmHg.

Yield: 81%

EXAMPLE 20

To 2.0 parts by weight of 5-cyclohexyl-6-chloroindan-1-carbonitrile are added 50 parts by volume of 38% acetic acid solution of boron trifluoride and 5 parts by volume of water. The mixture is heated so as to dissolve 5-cyclohexyl-6-chloroindan-1-carbonitrile into the solution and then allowed to stand overnight at room temperature. To the reaction mixture is added 1,000 parts by volume of water and the resulting precipitates are collected by filtration, washed with water and dehydrated. The precipitates are recrystallized from methanol to give 5-cyclohexyl-6-chloroindan-1-carboxyamide.

Melting point: 184°–186.5°C.

Yield: 77.3%

Elementary analysis: Calculated for $C_{16}H_{20}ClNO$: C, 69.17; H, 7.26; N, 5.04; Cl 12.77. Found: C, 69.04; H, 7.08; N, 4.95; Cl 12.70.

EXAMPLE 21

2.0 Parts by weight of 5-cyclohexyl-6-chloroindan-1-carbonitrile is dissolved in 100 parts by volume of methanol and, to the solution are added 10 parts by volume of a 5% aqueous solution of sodium hydroxide and 3 parts by volume of 30% aqueous solution of hydrogen peroxide. And then, the mixture is warmed at 60°C for 2 hours and acidified with dilute hydrochloric acid. To the solution is added 1,500 parts by volume of water, and the mixed solution is allowed to stand overnight at room temperature. The precipitates are collected by filtration, washed with water and dehydrated. The precipitates are, then, recrystallized from methanol, whereby 5-cyclohexyl-6-chloroindan-1-carboxyamide is obtained.

Melting point: 184.5°–186.5°C.

Yield: 82%

Elementary analysis: Calculated for $C_{16}H_{20}ClNO$: C, 69.17; H, 7.26; N, 5.04; Cl 12.77. Found: C, 68.98; H, 7.21; N, 4.98; Cl 12.53.

EXAMPLE 22

To 2.0 parts by weight of 5-cyclohexyl-6-chloroindan-1-carbonitrile is added 100 parts by weight of polyphosphoric acid, and then the mixture is treated after a manner similar to Example 13, whereby 5-cyclohexyl-6-chloroindan-1-carboxyamide is obtained.

Melting point: 184.5°–186.5°C.

Yield: 82%

Elementary analysis: Calculated for $C_{16}H_{20}ClNO$: C, 69.17; H, 7.26; N, 5.04; Cl, 12.77. Found: C, 69.11; H, 7.30; N, 5.03; Cl, 12.68.

(Step I)

REFERENCE EXAMPLE 1

A four-necked flask is filled with 405 parts by weight of cyclohexylbenzene, 390 parts by weight of anhydrous aluminum chloride and 2,000 parts by volume of carbon disulfide and under stirring and cooling with ice, a solution of 315 parts by weight of α-chloropropionyl chloride in 250 parts by volume of carbon disulfide is added dropwise over about an hour. The mixture is stirred at room temperature for 1 hour, after which time it is poured in ice-water. The organic layer is taken, washed with water and dehydrated. The organic solvent is distilled off and the residue is crystallized from n-hexane. The procedure gives 580 parts by weight of white needles of ω-chloro-4-cyclohexylpropiophenone.

Melting point: 58°–59°C.

Yield: 91.5%

Elementary analysis: Calculated for $C_{15}H_{19}ClO$: C, 71.84; H, 7.64 Found: C, 71.66; H, 7.58

(Step J)

REFERENCE EXAMPLE 2

A four-necked flask is filled with 5 parts by weight of ω-chloro-4-cyclohexylpropiophenone and under cooling, 50 parts by volume of concentrated sulfuric acid is added dropwise. After the dropwise addition has been completed, the mixture is gradually heated on a water bath to 90°C, at which temperature it is further heated for 1 hour. Thereafter, the mixture is poured into ice-water and extracted with benzene. The extract is washed with water, dehydrated and distilled to remove the solvent, whereupon a dark brown oil is obtained. Crystallization from n-hexane yields 3.9 parts by weight of white crystals of 5-cyclohexyl-1-indanone.

Melting point: 77°–78°C.

Yield: 88%

Elementary analysis: Calculated for $C_{15}H_{18}O$: C, 84.06; H, 8.47. Found: C, 83.98; H, 8.54.

(Steps I and J)

REFERENCE EXAMPLE 3

Under cooling with ice and stirring, 12.7 parts by weight of β-chloropropionyl chloride is added dropwise to a mixture of 16 parts by weight of cyclohexylbenzene, 15 parts by weight of aluminum chloride and 50 parts by volume of carbon disulfide. Then, the mixture is stirred at room temperature for 1 hour, after which time the carbon disulfide is distilled off at 20°–30°C. Under stirring, 100 parts by volume of concentrated sulfuric acid is gradually added to the residue and the mixture is gradually heated to 90°C. The mixture is stirred at this temperature for 1 hour and, then, is poured in ice-water and extracted with benzene. The extract is washed with water, dehydrated and distilled to remove the benzene. Finally the residue is crystallized from n-hexane, whereupon 17.5 parts by weight of 5-cyclohexyl-1-indanone is obtained as needles melting at 75°–77°C.

Yield: 82%
(Step K)

REFERENCE EXAMPLE 4

In 150 parts by volume of methanol is dissolved 30 parts by weight of 5-cyclohexyl-1-indanone and under stirring and cooling with ice, 10 parts by weight of sodium borohydride is gradually added. The mixture is heated on reflux for 30 minutes, at the end of which time the solvent is distilled off. The residue is diluted with water and extracted with benzene. The extract is washed with water, dehydrated and distilled to remove the solvent, whereupon a light-brown crystalline residue is obtained. This residue is further recrystallized from n-hexane. The procedure gives 28 parts by weight of 5-cyclohexyl-1-indanol as colorless crystals melting at 88°–90°C.

Yield: 93%
Elementary analysis: Calculated for $C_{15}H_{20}O$: C, 83.28; H, 9.32. Found: C, 83.06; H, 9.44.

What is claimed is:

1. A process for producing a compound of the formula:

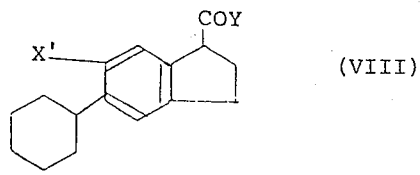 (VIII)

wherein X' stands for a halogen atom and Y stands for a hydroxyl group, an amino group or an alkoxy group having 1 to 6 carbon atoms, which comprises reacting:

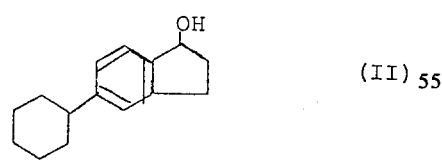 (II)

with an aromatic sulfonylating agent in the presence of a solvent to produce

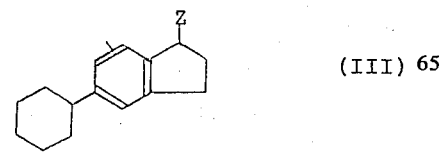 (III)

wherein Z stands for an aryl sulfonyloxy group, which is then reacted with a halogen, sulfuryl halide, N-bromosuccinimide or N-chlorosuccinimide in the presence of a solvent at a temperature not exceeding 100°C to produce

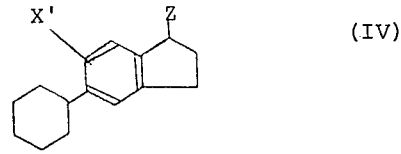 (IV)

wherein X' and Z have the same meaning as above, which is then reacted with an alkali metal cyanide in the presence of a solvent to produce

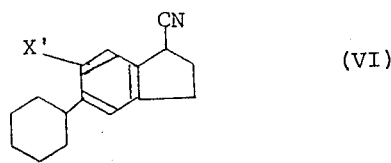 (VI)

wherein X' has the same meaning as above, which is then subjected to hydrolysis or to alcohol addition with subsequent hydrolysis to produce

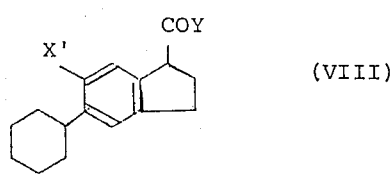 (VIII)

wherein X' and Y have the same meaning as above.

2. A process according to claim 1 wherein the aromatic sulfonylating agent is tosyl chloride, employed in a proportion of 1 to 2 moles per mole of compound II, the halogenating agent for compound III is chlorine, bromine or iodine, the proportion of halogenating agent being about 1 to 2 moles of halogen per mole of compound III and the alkali metal cyanide is employed in an amount of about 1 to 5 moles per mole of compound IV.

3. A process for the production of

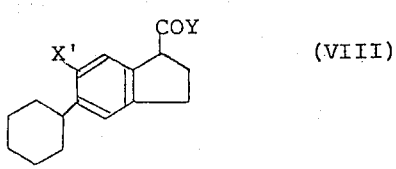 (VIII)

wherein X' stands for a halogen atom and Y stands for a hydroxyl, amino or alkoxy group having 1 to 6 carbon atoms which comprises reacting

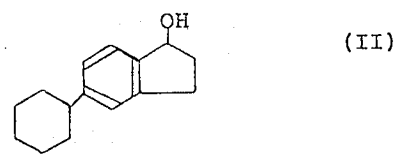 (II)

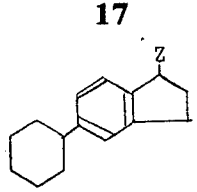

(III)

wherein Z stands for a halogen atom, which is then reacted with a halogen, sulfuryl halide, N-bromosuccinimide or N-chlorosuccinimide in the presence of a solvent at a temperature not exceeding 100°C to produce

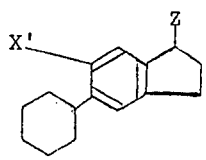

(IV)

wherein X' and Z have the same meanings as above, which is then reacted with an alkali metal cyanide in the presence of a solvent to produce

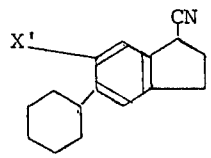

(VI)

wherein X' has the same meaning as above, which is then subjected to hydrolysis or to alcohol addition with subsequent hydrolysis to produce

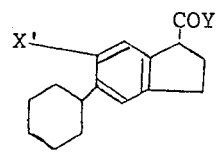

(VIII)

wherein X' and Y have the same meaning as above.

4. A process according to claim 3 wherein the halogenating agent for compound II is hydrogen halide or thionyl chloride, employed in a proportion of 1 to 2 moles per mole of compound II, the halogenating agent for compound III is chlorine, bromine or iodine, the proportion of halogenating agent being 1 to 2 moles of halogen per mole of compound III and the alkali metal cyanide is employed in an amount of about 1 to 5 moles per mole of compound IV.

* * * * *